US005518783A

United States Patent [19]

Kawata et al.

[11] Patent Number: 5,518,783

[45] Date of Patent: May 21, 1996

[54] OPTICAL COMPENSATORY SHEET AND LIQUID CRYSTAL DISPLAY

[75] Inventors: Ken Kawata; Masaki Okazaki, both of Kanagawa, Japan

[73] Assignee: Fuji Photo Film Co., Ltd., Minami-ashigara, Japan

[21] Appl. No.: 419,617

[22] Filed: Apr. 10, 1995

[30] Foreign Application Priority Data

Apr. 8, 1994 [JP] Japan ...................................... 6-070591

[51] Int. Cl.[6] ...................................... G02F 1/1335

[52] U.S. Cl. ...................................... 428/1; 359/73

[58] Field of Search ...................................... 428/1; 359/73

[56] References Cited

U.S. PATENT DOCUMENTS 5,308,535 5/1994 Scheuble et al. ............................ 428/1

*Primary Examiner*—Alexander S. Thomas

*Attorney, Agent, or Firm*—Burns, Doane, Swecker & Mathis

[57] ABSTRACT

Disclosed is an optical compensatory sheet comprising a transparent support and an optically anisotropic layer provided thereon and having an optic axis inclined at 20 to 34 degrees from the normal of the sheet, wherein the optically anisotropic layer is formed from a discotic compound capable of forming a discotic nematic phase and an organic compound which has compatibility with the discotic compound and is capable of lowering a transition temperature of the discotic nematic phase by at least 10° C. Further, a liquid crystal display provided with the optical compensatory sheet is disclosed.

20 Claims, 4 Drawing Sheets

OPTICAL COMPENSATORY SHEET AND LIQUID CRYSTAL DISPLAY

BACKGROUND OF THE INVENTION

1. Field of the Invention

The present invention relates to an optical compensatory sheet and a liquid crystal display provided with the optical compensatory sheet.

2. Description of Prior Art

As a display for electronic office system-devices such as a desk-top personal computer and a word processor for Japanese language, CRT (cathode ray tube) has been employed so far. Recently, a liquid crystal display (hereinafter referred to as LCD) is increasingly employed instead of the CRT because of its thin thickness, light weight and low power consumption. LCD generally has a structure that a liquid crystal cell is disposed between a pair of polarizing sheets. Most of LCD use a twisted nematic liquid crystal. Operational mode of LCD using the twisted nematic liquid crystal is roughly divided into birefringence mode and optical rotatory mode.

A super twisted nematic liquid crystal display (hereinafter referred to as STN-LCD) utilizing the birefringence mode uses a super twisted nematic liquid crystal showing a twisted angle of more than 90 degrees and having steep electro-optical characteristics. Such STN-LCD, therefore, has an advantage of giving display of a large capacity by driving in time-sharing mode. However, the STN-LCD has disadvantages such as slow response (several hundred milliseconds) and difficulty in giving satisfactory gradation on display, and therefore its display characteristics are relatively poor, as compared with display characteristics of a liquid crystal display using the known active-type elements (e.g., TFT-LCD and MIM-LCD).

In the TFT-LCD and MIM-LCD, twisted nematic liquid crystal showing a twisted angle of 90 degrees is employed for displaying an image. This is called LCD of an optically rotary mode (i.e., TN-LCD). TN-LCD display mode shows fast response (several tens of milliseconds) and high display contrast, and easily gives black-white display of high contrast. Hence, the optical rotatory mode has a number of advantages compared with the birefringence mode or other modes. However, TN-LCD has disadvantages that color or contrast on display varies depending upon viewing direction to a liquid crystal display, and its display characteristics are not comparable to display characteristics of CRT.

In order to improve the viewing angle characteristics (i.e. to enlarge the viewing angle), arrangement of a phase difference film (optical compensatory sheet) between a pair of polarizing plates and TN liquid crystal cell has been proposed in Japanese Patent Provisional Publications No. 4(1992)-229828 and No. 4(1992)-258923.

The phase difference films proposed in these Publications show no optical effect when a liquid crystal display is seen from the direction vertical to a screen of the display because phase difference in the direction perpendicular to a surface of the liquid crystal display is almost zero. However, the phase difference film serves for compensation of phase difference (depending upon wave-lengths of light) that occurs when the liquid crystal display is viewed from an oblique direction. The phase difference results in unfavorable viewing angle characteristics such as coloring and disappearance of displayed image.

Even a liquid crystal display provided with such phase difference film is still not improved particularly in coloring of a displayed image and reversing of black-and-white image when the viewing direction to the liquid crystal display is greatly inclined to height or width direction to the normal to a surface of the screen. Thus, such liquid crystal display cannot be employed instead of CRT, and further is not suitable for loading in a vehicle (e.g., motor car).

Japanese Patent Provisional Publications No. 4(1992)-366808 and No. 4(1992)-366809 disclose a difference phase film of a liquid crystal cell comprising a chiral nematic liquid crystal that an optic axis is inclined to enlarge the viewing angle. The difference phase film is composed of two liquid crystal cells, and therefore needs a complicated process for its preparation and brings about increase of its weight.

Japanese Patent Provisional Publications No. 4(1992)-113301, No. 5(1993)-80323 and No. 5(1993)-157913 disclose a phase difference film of polymer chain whose optic axis or an optical elastic axis is inclined from a surface of a liquid crystal cell. The phase difference film is prepared by slicing obliquely a uniaxial polycarbonate film, and therefore a phase difference film of a large area cannot be easily prepared according to the disclosed process. Further, the publications are for inventions with regard to STN-LCD and therefore give no teachings as to the use with TN-LCD.

Japanese Patent Provisional Publication No. 5(1993)-215921 discloses the use of a birefringence plate comprising a pair of supports and a rod-like compound showing liquid crystal property. The rod-like compound showing liquid crystal property is prepared by interposing and curing the compound to compensate difference phase of LCD. However, the birefringence plate has the same structure as one of the two liquid crystal cell as mentioned above, and therefore needs a complicated process for its preparation, which is not suitable for mass production. Further, its structure brings about increase of weight. Furthermore, the publications are for inventions with regard to STN-LCD and therefore give no teachings as to the use for TN-LCD.

Japanese Patent Provisional Publications No. 3(1991)-9326 and No. 3(1991)-291601 disclose an optical compensatory sheet for LCD which is prepared by coating a solution of a polymer showing liquid crystal property on an orientation layer provided on a support film. However, the polymer showing liquid crystal property is not satisfactorily oriented on the orientation layer. Hence, the resulting compensatory sheet scarcely enlarges the viewing angle from all directions.

EP 0576302 A1 discloses a phase difference plate comprising a material having optical anisotropy in a flat plate in which the direction of the principal refractive index of the index ellipsoid is inclined from the normal of the surface. The disclosed phase difference plate shows great enlargement of the viewing angle compared with other known phase difference films as mentioned above. However, LCD provided with such phase difference plate is not comparable to CRT in the viewing angle characteristics.

SUMMARY OF THE INVENTION

The present applicant has filed an application for patent relating to an optical compensatory sheet which comprises a layer comprising discotic liquid crystal (U.S. patent application Ser. No. 08/310,101 or E. P. Patent Application No. 94 114 956.9). According to the studies of the inventors, although the viewing angle is enlarged in the optical compensatory sheet, the following problems are not still resolved. In more detail, the optical compensatory sheet is generally prepared by heating a layer of discotic liquid crystal provided on a transparent support at temperature of forming discotic nematic crystal phase. The heating frequently damages the transparent support because of too high temperature compared to melting point of material of the support. Further, it is not easy to control precisely and uniformly the inclined angles in the all viewing angles of discotic liquid crystal in the condition of discotic nematic crystal phase.

It is an object of the present invention to provide a novel optical compensatory sheet which is, when it is fixed on a liquid crystal cell, capable of greatly enlarging viewing angle and can be easily prepared by heat-treatment at low temperature (i.e., conducting heat-treatment for forming a discotic nematic phase at lower temperature than conventional temperature).

It is another object of the invention to provide a liquid crystal display provided with a novel optical compensatory sheet wherein viewing angle is greatly enlarged and can be easily prepared.

There is provided by the invention an optical compensatory sheet comprising a transparent support and an optically anisotropic layer provided thereon and having an optic axis inclined at 20 to 34 degrees from the normal of the sheet.

Wherein the optically anisotropic layer is formed from a discotic compound capable of forming a discotic nematic phase and an organic compound which has compatibility with the discotic compound and is capable of lowering a transition temperature of the discotic nematic phase by at least 10° C.

Preferred embodiments of the optical compensatory sheet of the invention are as follows:

1) The optical compensatory sheet wherein an orientation layer is provided between the transparent support and the optically anisotropic layer.

2) The optical compensatory sheet wherein the optically anisotropic layer is in the condition of the discotic nematic phase.

3) The optical compensatory sheet wherein the organic compound is a discotic compound capable of forming no discotic nematic phase.

4) The optical compensatory sheet wherein the discotic compound capable of forming a discotic nematic phase has one structure selected from a benzene structure, a triphenylene structure, a truxene structure and a phthalocyanine structure.

5) The optical compensatory sheet wherein the organic compound is a discotic compound having one structure selected from a benzene structure, a triphenylene structure, a truxene structure and a phthalocyanine structure.

6) The optical compensatory sheet wherein the discotic compound capable of forming a discotic nematic phase has a triphenylene structure.

7) The optical compensatory sheet wherein the organic compound is a discotic compound having a triphenylene structure.

8) The optical compensatory sheet wherein the ratio between the discotic compound capable of forming a discotic nematic phase and the organic compound is in the range of 50:50 to 99:1, by weight.

9) The optical compensatory sheet wherein the discotic compound capable of forming a discotic nematic phase has the formula (1):

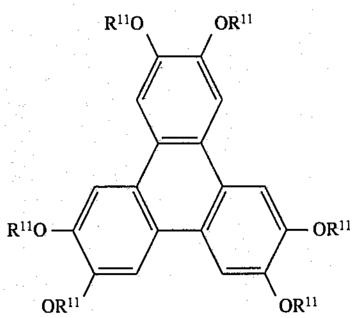

(1)

in which $R^{11}$ represents the group (1a):

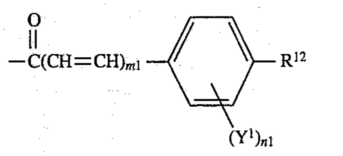

(1a)

wherein $R^{12}$ represents an alkoxy group, $Y^1$ represents a halogen atom, an alkyl group of 1 to 3 carbon atoms or an alkoxy group of 1 to 3 carbon atoms, m1 represents 0 or 1 and n1 represents 0, 1 or 2, the number of the carbon atom of $R^{12}$ being not less than that of $Y^1$.

10) The optical compensatory sheet wherein the organic compound is a discotic compound having the formula (2):

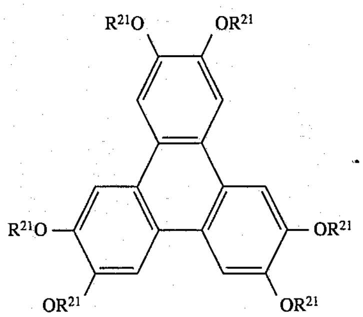

(2)

in which $R^{21}$ represents the group (2a):

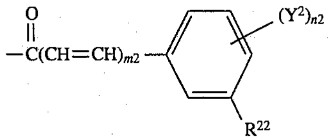

(2a)

wherein $R^{22}$ represents an alkyl group or an alkoxy group, $Y^2$ represents a halogen atom, an alkyl group of 1 to 7 carbon atoms or an alkoxy group of 1 to 7 carbon atoms, m2 represents 0 or 1 and n2 represents 0, 1 or 2, the number of the carbon atom of $R^{22}$ being not less than that of $Y^2$.

11) The optical compensatory sheet as described above 10), wherein $R^{22}$ represents an alkoxy group.

12) The optical compensatory sheet-as described above 2) wherein the orientation layer is a polymer layer which has been subjected to rubbing treatment.

13) The optical compensatory sheet as described above 2) wherein the orientation layer is prepared by obliquely depositing an inorganic compound on the support.

14) The optical compensatory sheet wherein the transparent film has a light transmittance of not less than 80%, shows optically isotropy on the plane of the film, and satisfies the condition of:

$$30 \leqq [(nx+ny)/2-nz] \times d \leqq 150$$

in which nx and ny are main refractictive indices on the plane of the support, nz is a main refractive index in the thickness direction, and d is the thickness of the film, unit of d being nm.

Further, there is provided by a liquid crystal display comprising a liquid crystal cell which comprises a pair of substrates provided with a transparent electrode and twist-oriented nematic liquid crystal sealed therebetween, a pair of polarizing sheets arranged on both sides of the cell, and an optical compensatory sheet provided between the liquid crystal cell and the polarizing sheet;

wherein the optical compensatory sheet comprises a transparent support and an optically anisotropic layer provided thereon and has an optic axis inclined at 20 to 34 degrees from the normal of the sheet, the optically anisotropic layer being formed from a discotic compound capable of forming a discotic nematic phase and an organic compound which has compatibility with the discotic compound and is capable of lowering a transition temperature of the discotic nematic phase by at least 10° C.

Preferred embodiments of the display of the invention are as follows:

1) The liquid crystal display wherein an orientation layer is provided between the transparent support and the optically anisotropic layer.

2) The liquid crystal display sheet wherein the optically anisotropic layer is in the condition of the discotic nematic phase.

3) The liquid crystal display wherein the organic compound is a discotic compound capable of forming no discotic nematic phase.

4) The liquid crystal display wherein the discotic compound capable of forming a discotic nematic phase has a triphenylene structure.

5) The liquid crystal display wherein the organic compound is a discotic compound having a triphenylene structure.

The optical compensatory sheet of the invention is, in the case that it is attached to a liquid crystal cell, capable of greatly enlarging viewing angle. Further, the sheet can be easily prepared by heat-treatment at low temperature.

In more detail, the optical compensatory sheet is prepared from the mixture of the discotic compound capable of forming a discotic nematic phase and the specific organic compound and has an optic axis inclined at 20 to 34 degrees from the normal of the sheet, whereby heat-treatment for forming a discotic nematic phase can be conducted at lower temperature than that in heat-treatment of an optical compensatory sheet using one kind of discotic compound. Therefore, inclined angle of the discotic compounds can be controlled under heating at low temperature. For the reason, particularly in the case of the sheet comprising the support and the layer of discotic compounds, the discotic nematic phase can be formed without imparting damage to the support.

Further, it is easy to control macroscopically at a specific inclined angle the discotic compound in the condition of discotic nematic crystal phase, in the preparation of the sheet.

Thus, the optical compensatory sheet of the invention has excellent viewing characteristics and can be prepared in high productivity.

Moreover, the liquid crystal display provided with the sheet shows an enlarged viewing angle and is prepared in high productivity. Further, the display is greatly improved in viewing characteristics such as coloring of a displayed image and reversing of black-and-white image when the viewing direction to the liquid crystal display is greatly inclined from the normal to a surface of the screen.

DETAILED DESCRIPTION OF THE INVENTION

Figure 1:
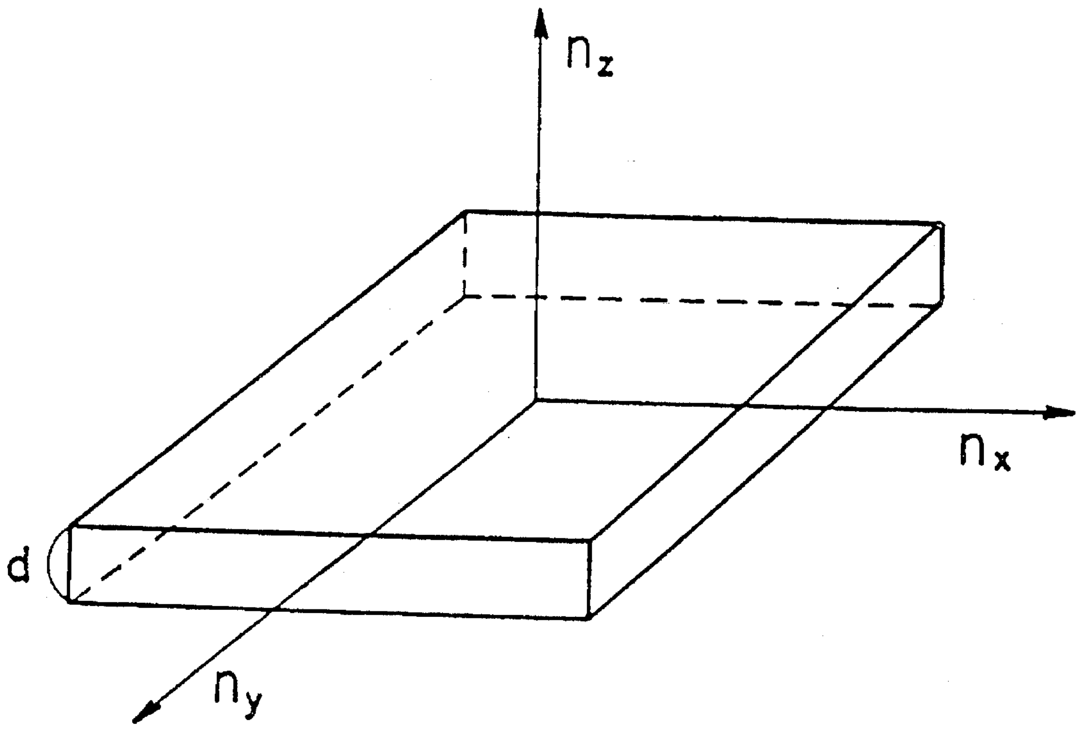
FIG. 1 is a view schematically showing the refractive indices of the three axes of the transparent film of the invention.

The optical compensatory sheet of the invention an optical compensatory sheet has a basic structure comprising a transparent support and an optically anisotropic layer provided thereon. The optically anisotropic layer is formed from a discotic compound capable of forming a discotic nematic phase and an organic compound which has compatibility with the discotic compound and is capable of lowering a transition temperature of the discotic nematic phase by at least 10° C. Further, the optical compensatory sheet has a direction of an optic axis inclined at 20 to 34 degrees from the normal of the sheet.

The phases formed of discotic compounds having liquid crystal property are roughly divided into a columnar phase wherein discotic molecules of the discotic liquid crystals are superposed in the form of column by intermolecular force, a discotic nematic phase wherein discotic molecules are aggregated in a random fashion, and a chiral discotic nematic phase wherein discotic molecules are arranged in helical structure, as described in Mol. Cryst. Liq. Cryst. (C. Destrade et al. vol. 71, pp.111, 1981).

Therefore, some of discotic compounds are capable of forming discotic nematic phase by heating, but the discotic compounds generally show high phase transition temperature of from crystal phase to discotic nematic phase. The studies of the inventors have found that the combination of the discotic compound capable of forming discotic nematic phase and the discotic compound capable of forming no discotic nematic phase reduces the phase transition temperature. In the place of the discotic compound capable of forming discotic nematic phase, the use of the discotic compound capable of forming monoaxial columnar phase can be also presumed to reduce its phase transition temperature.

The optical compensatory sheet of the invention basically comprises a transparent support and the an optically anisotropic layer comprising the discotic compound capable of forming a discotic nematic phase and the specific organic compound provided thereon. Further, an orientation layer is preferably provided between the transparent support and the optically anisotropic layer.

Examples of the discotic compound capable of forming a discotic nematic phase employable in the invention include compounds having a benzene structure, a triphenylene structure, a truxene structure and a phthalocyanine structure, which are described in Mol. Cryst. Liq. Cryst. (C. Destrade et al. vol. 71, pp.111, 1981) mentioned above. The discotic compound generally has a structure that the basic skeleton of the above compound is located at a center of the compound and further straight chain groups such as alkyl, alkoxy and benzoyl having a substituent are radially bonded to the skeleton. Preferred is a compound having triphenylene structure.

In contrast, the special organic compound of the invention, i.e., the compound which has compatibility with the discotic compound capable of forming a discotic nematic phase and is capable of lowering a transition temperature to the discotic nematic phase by at least 10° C., generally includes the following compounds. Examples of the compounds include discotic compounds capable of forming no discotic nematic phase, liquid crystalline compounds (e.g., conventional nematic liquid crystalline compounds, cholesteric compounds), monomers capable of forming polymer, and fatty acids and derivatives thereof (e.g., stearic acid ester, behenic acid and dioctadesyldimethylammonium chloride)

The special organic compound preferably is a discotic compound capable of forming no discotic nematic phase. Examples of the compound include compounds having a benzene structure, a triphenylene structure, a truxene structure and a phthalocyanine structure, which are described above. Preferred is a compound triphenylene structure.

The triphenylene derivative (compound having triphenylene structure) generally has a structure wherein three benzene rings are condensed into one benzene ring so as to locate on radial positions against the one benzene ring, as shown the formula (1) or (2). The triphenylene derivative has substituents such as alkoxy, alkanoyloxy (hydroxyalkyloxy) and benzoyloxy on 2, 3, 6, 7, 10 and/or 11 positions of triphenylene. These triphenylene derivatives are apt to form a discotic nematic phase, especially its mono-domain phase, compared with other discotic compounds, and therefore they are preferred as the discotic compound capable of forming a discotic nematic phase in the invention. In more detail, for imparting optically anisotropic property to the sheet, it is necessary for molecules (discotic compounds) constituting the optical compensatory sheet (or the layer) to incline macroscopically (statistically) to a certain direction. Therefore, the triphenylene derivatives are preferred in the invention, because their inclined angles can be easily controlled to almost same angles. Thus, the inclined angles of discotic compounds of the layer can be also easily controlled macroscopically throughout the layer.

The discotic compound capable of forming a discotic nematic phase preferably has the formula (1):

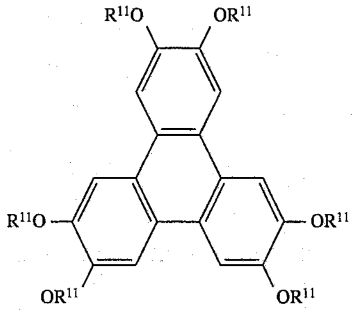

(1)

in which $R^{11}$ represents the group (1a):

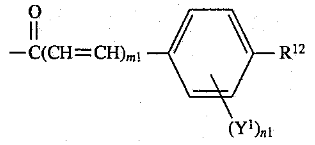

(1a)

wherein $R^{12}$ represents an alkoxy group, $Y^1$ represents a halogen atom, an alkyl group of 1 to 3 carbon atoms or an alkoxy group of 1 to 3 carbon atoms, m1 represents 0 or 1 and n1 represents 0, 1 or 2, the number of the carbon atom of $R^{12}$ being not less than that of $Y^1$.

In the formula (1), $R^{12}$ represents an alkoxy group or an alkoxy group having a substituent. The alkoxy group generally have 4 to 22 carbon atoms, preferably 4 to 12. Further, the alkoxy group preferably have a straight chain, and especially a straight chain having no substituent. Examples of the substituent include alkoxy, aryl and halogen such as fluorine, chlorine or bromine.

Examples of the alkoxy group having no substituent include n-pentyloxy, n-hexyloxy, n-heptyloxy, n-octyloxy, n-nonyloxy, n-decyloxy, n-undecyloxy or n-dodecyloxy. Examples of the alkoxy group having a substituent include alkoxyalkoxy groups such as 2-methoxyethoxy, 2-(2-methoxyethoxy)ethoxy, 2-[(2-methoxyethoxy)-2-methoxyethoxy]ethoxy, 2-n-butoxyethoxyl, 2-ethoxyethoxy, 2-(2-ethoxyethoxy)ethoxy, 3-methoxypropoxy, 3-ethoxypropoxy, 3-n-propyloxypropoxy and 3-benzyloxypropoxy; and aralkyloxy groups such as 2-phenylethoxy and 2-(4-n-butyloxyphenyl)ethoxy.

$Y^1$ generally represents an alkyl group of 1 to 3 carbon atoms such as methyl, ethyl or n-propyl, or an alkoxy group of 1 to 3 carbon atoms such as methoxy, ethoxy or n-propyloxy. $Y^1$ preferably is methyl, ethyl or methoxy, and especially methyl.

$m^1$ preferably is 0, and n1 preferably is 0 or 1, especially 0.

The discotic compound capable of forming no discotic nematic phase, which is preferred embodiment of the specific organic compound has the formula (2):

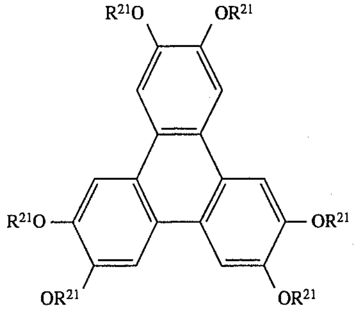
(2)

in which $R^{21}$ represents the group (2a):

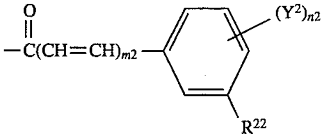
(2a)

wherein $R^{22}$ represents an alkyl group or an alkoxy group (preferably an alkoxy group), $Y^2$ represents a halogen atom, an alkyl group of 1 to 7 carbon atoms or an alkoxy group of 1 to 7 carbon atoms, m2 represents 0 or 1 and n2 represents 0, 1 or 2, the number of the carbon atom of $R^{22}$ being not less than that of $Y^2$.

In the formula (2), $R^{22}$ represents an alkyl group, an alkyl group having a substituent, an alkoxy group or an alkoxy group having a substituent. The alkyl group and alkoxy group generally have 4 to 22 carbon atoms, preferably 4 to 12. Further, the alkyl group and alkoxy group preferably have a straight chain, and especially a straight chain having no substituent. Examples of the substituent include alkoxy, aryl and halogen such as fluorine, chlorine or bromine.

Examples of the alkyl group having no substituent include n-pentyl, n-hexyl, n-heptyl, n-octyl, n-nonyl, n-decyl, n-undecyl or n-dodecyl. Examples of the alkyl group having a substituent include alkoxyalkyl groups such as 2-methoxyethyl, 2-(2-methoxyethoxy)ethyl, 2-[(2-methoxyethoxy)-2-methoxyethoxy]ethyl, 2-n-butoxyethyl, 2-ethoxyethyl, 2-(2-ethoxyethoxy)ethyl, 3-methoxypropyl, 3-ethoxypropyl, 3-n-propyloxypropyl and 3-benzyloxypropyl; and aralkyl groups such as 2-phenylethyl and 2-(4-n-butyloxyphenyl)ethyl.

Examples of the alkoxy group having no substituent include n-pentyloxy, n-hexyloxy, n-heptyloxy, n-octyloxy, n-nonyloxy, n-decyloxy, n-undecyloxy or n-dodecyloxy. Examples of the alkyl group having a substituent include alkoxyalkoxy groups such as 2-methoxyethoxy, 2-(2-methoxy)ethoxy, 2-[(2-methoxyethoxy )-2-methoxyethoxy] ethoxy, 2-n-butoxyethoxyl, 2-ethoxyethoxy, 2-(2-ethoxyethoxy)ethoxy, 3-methoxypropoxy, 3-ethoxypropoxy, 3-n-propyloxypropoxy and 3-benzyloxypropoxy; and aralkyloxy groups such as 2-phenylethoxy and 2-(4-n-butyloxyphenyl)ethoxy.

$Y^2$ generally represents an alkyl group of 1 to 7 carbon atoms (preferably 1 to 5 carbon atoms and especially 3 to 5 carbon atoms) which may be substituted with a halogen atom such as such as fluorine, chlorine or bromine. Preferred examples of the alkyl group include methyl, ethyl, n-propyl, n-butyl, n-pentyl, n-hexyl and n-heptyl. Preferred examples of the alkoxyalkyl group include 2-methoxyethyl and 2-(2-methoxyethoxy-)ethyl.

m2 preferably is 0, and n2 preferably is 0 or 1, especially 0.

A ratio between the discotic compound capable of forming a discotic nematic phase, and the specific orgamoc compound is in the range of 50:50 to 99:1 (the former:the latter) by weight, and especially 60:40 to 90:10.

Preferred examples of the compounds of the formula (1) are set forth below.

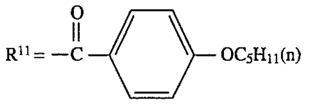
1-1

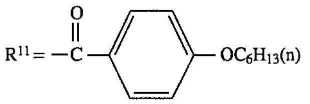
1-2

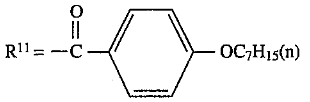
1-3

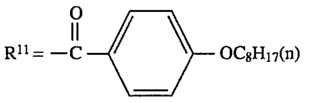
1-4

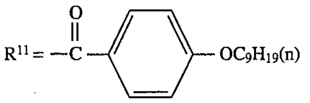
1-5

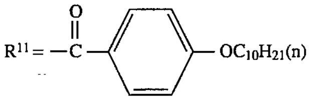
1-6

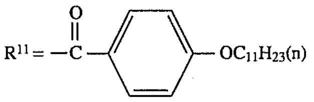
1-7

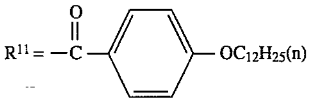
1-8

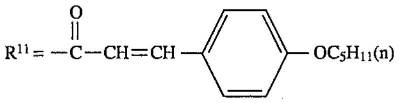
1-9

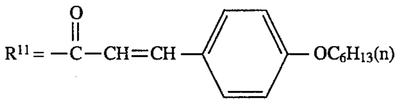
1-10

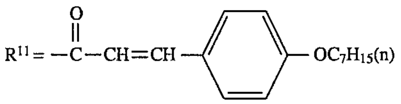
1-11

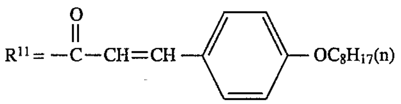
1-12

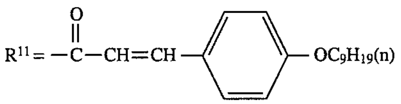
1-13

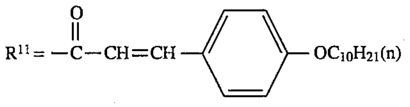
1-14

-continued
1-15
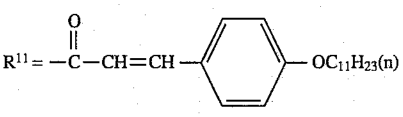
1-16
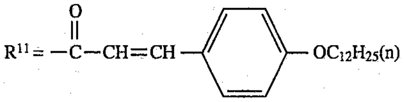
1-17
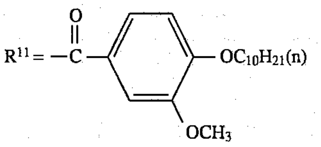
1-18
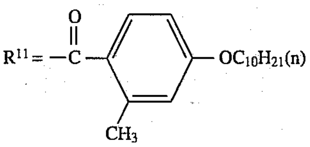
1-19
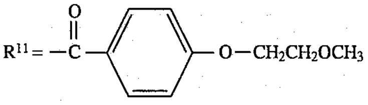
1-20
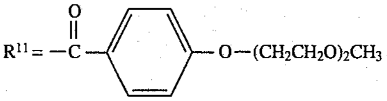
1-21
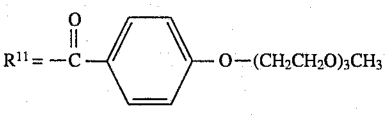
1-22
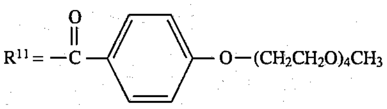
1-23
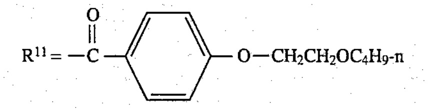
1-24
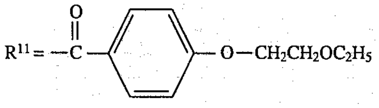
1-25
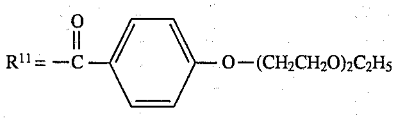
1-26
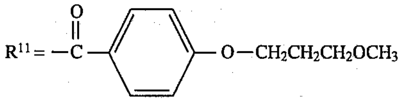
1-27
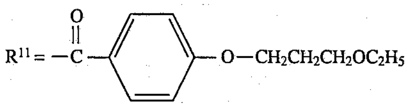
1-28
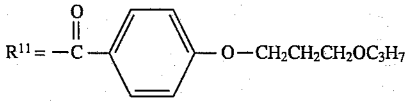
-continued
1-29
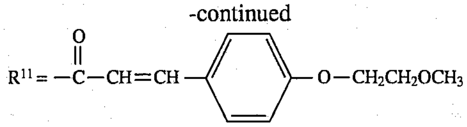
1-30
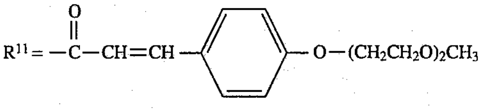
1-31
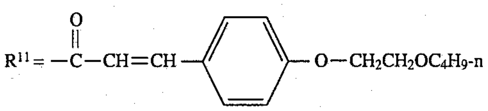
1-32
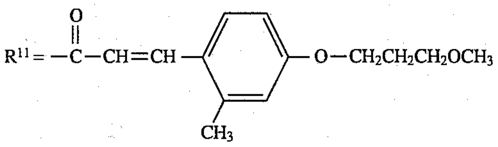
1-33
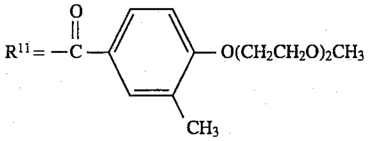
1-34
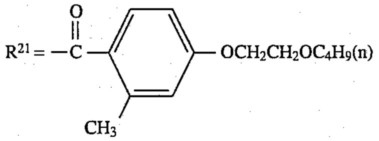
1-35
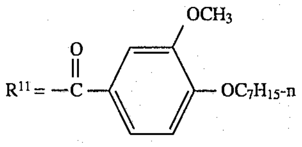
1-36
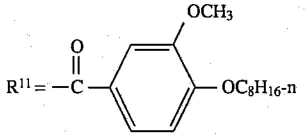
1-37
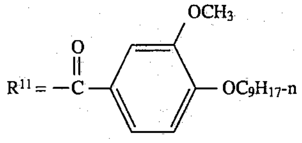
1-38
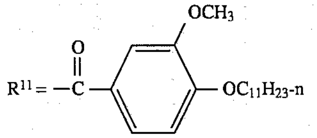
1-39
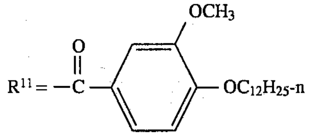
1-40
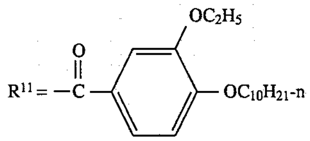

-continued

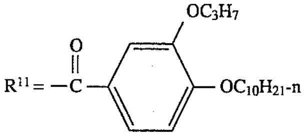

1-41

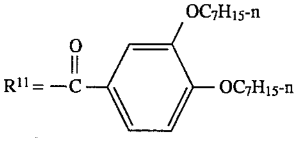

1-42

Examples of the discotic compounds capable of forming no discotic nematic are set fourth below. The examples are represented by $R^{11}$ of the formula (1), although the examples are outside of definition of the formula (1).

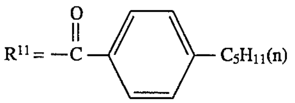

1-43

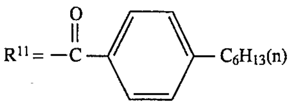

1-44

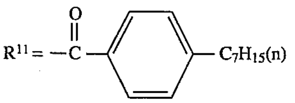

1-45

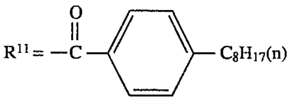

1-46

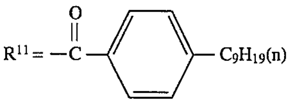

1-47

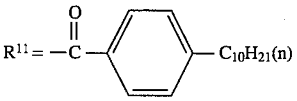

1-48

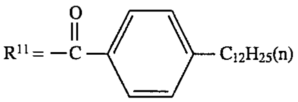

1-49

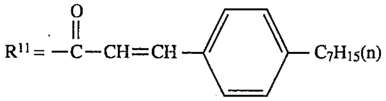

1-50

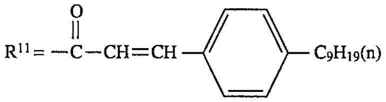

1-51

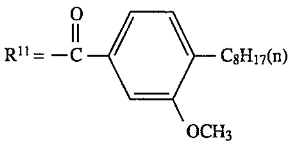

1-52

Preferred examples of the compounds of the formula (2) (examples of the discotic compound capable of forming no discotic nematic) are set forth below.

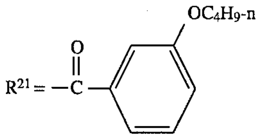

2-1

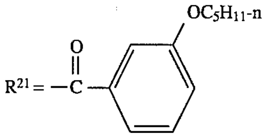

2-2

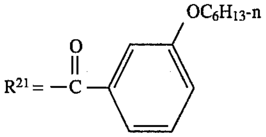

2-3

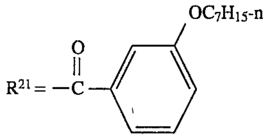

2-4

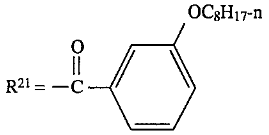

2-5

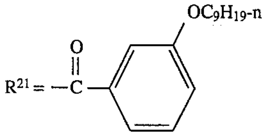

2-6

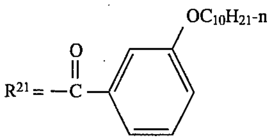

2-7

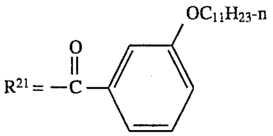

2-8

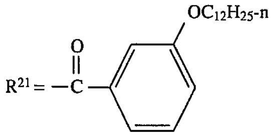

2-9

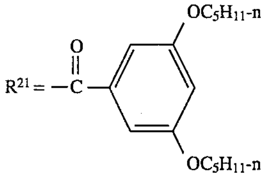

2-10

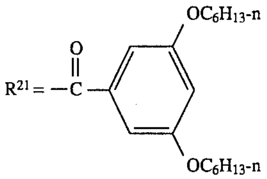

2-11

-continued
2-12
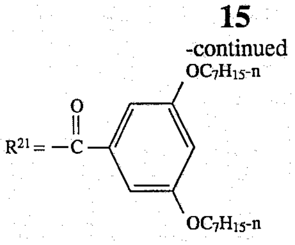
2-13
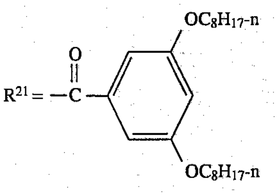
2-14
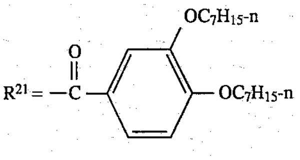
2-15
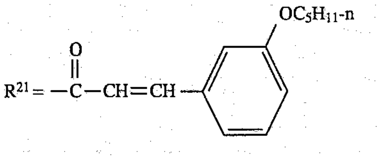
2-16
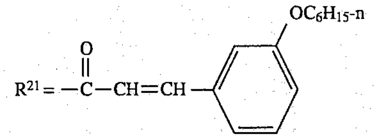
2-17
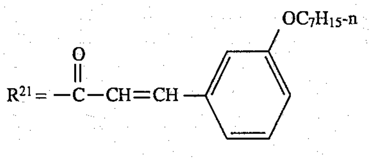
2-18
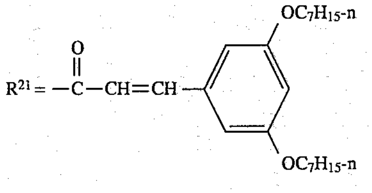
2-19
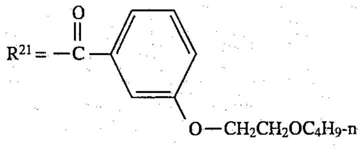
2-20
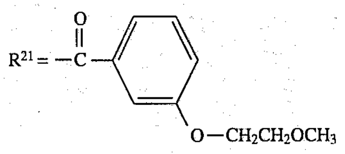
2-21
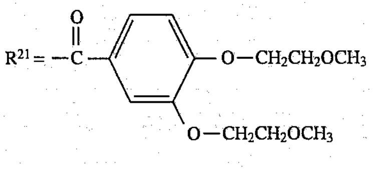
-continued
2-22
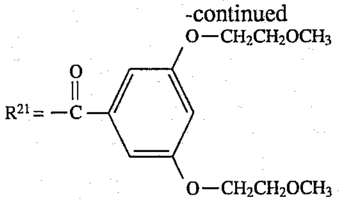
2-23
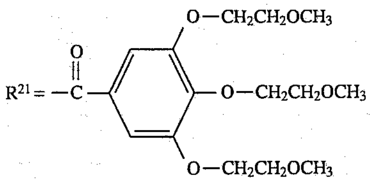
2-24
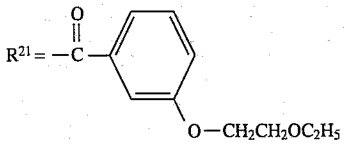
2-25
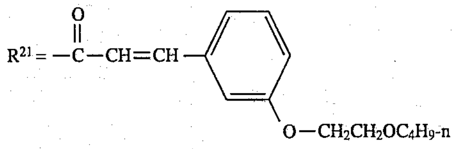
2-26
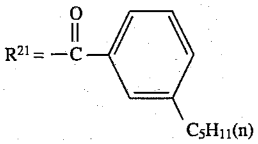
2-27
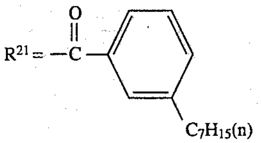
2-28
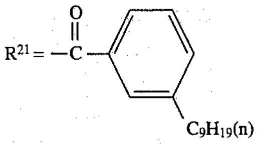
2-29
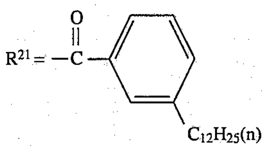
2-30
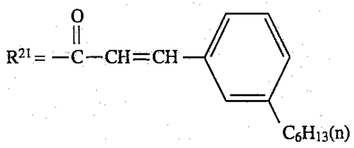
2-31
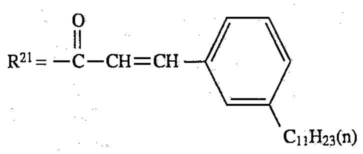
2-32
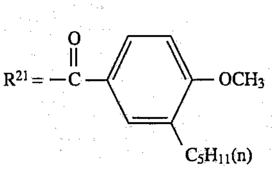

-continued

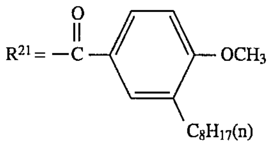
2-33

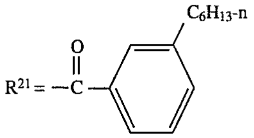
2-34

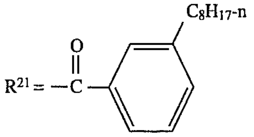
2-35

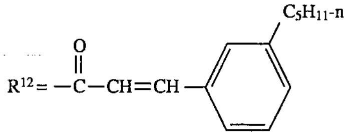
2-36

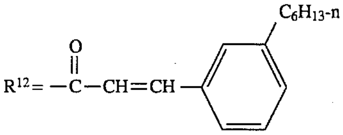
2-37

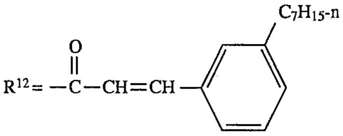
2-38

The triphenylene compounds as described above, can be synthesized by esterification of 2,3,6,7,10,11-hexahydroxy triphenylene and substituted benzoyl chloride. This esterification can be conducted based on the methods described in Organic Functional Group Preparations Part I (Sandler and Karo, Chap. 10, edit. by Academy Press in 1968).

Examples of bases employed in the esterification include aromatic amines such as pyridine, and tertiary amines such as triethylamine and diisopropylethylamine. Preferred is pyridine. Examples of solvents employed in the esterification include polar solvents such as N,N-dimethylformamide (DMF), dimethyl sulfoxide (DMSO), N-dimethylacetoamide (DMAc) and pyridine, and alkyl halides such as chloroform and dichloromethan. The polar solvents are preferred, especially pyridine.

Reaction of the esterification is generally conducted at a temperature of −80° to 150° C., preferably −10° to 100° C. and especially 10° to 80° C.

2,3,6,7,10,11-Hexamethoxy triphenylene, which is raw material of the triphenylene compound, can be synthesized according to methods described in Advanced Materials (No. 2, pp.40, 1990) can be also utilized. Further, the 2,3,6,7,10,11-hexahydroxy triphenylene as mentioned above can be synthesized according to methods for synthesizing 2,3,6,7,10,11-hexamethoxy triphenylene described above except conducting no addition of acetic anhydride in the course of the synthesis of 2,3,6,7,10,11-hexamethoxy triphenylene. The 2,3,6,7,10,11-hexahydroxy triphenylene can be obtained in yield similar to that of 2,3,6,7,10,11-hexamethoxy triphenylene.

Synthetic examples of the triphenylene compounds having the formulae (1) and (2) are described below.

Synthetic Example 1

Synthesis of triphenylene compound (1-3; the number of the compounds described above)

1-a) Synthesis of 2,3,6,7,10,11-hexamethoxytriphenylene (HMTP)

In a 2-liter three-necked flask cooled with ice, 135 ml of ice water and 150 g of iron(III) chloride were placed to completely dissolve iron(III) chloride in ice water, and 30 g of veratorol was added to the solution. To the solution, 490 ml of concentrated sulfuric acid was gradually added with stirring. After reaction of 12 hours, the reaction mixture was poured into 3 liter of ice water. After 3 hour, the precipitated product was filtered through a glass filter to obtain crude crystals of the above compound (HMTP) of 13 g (yield: 43%).

1-b) Synthesis of 2,3,6,7,10,11-hexahydroxytriphenylene (HHTP)

In 50 ml of dichloromethane, 10.3 g of the obtained compound (HMTP) was suspended to prepare a suspension and 15.5 ml of boron trifluoride was gradually added to the suspension. After reaction of 2 hours, the suspension was poured into 500 ml of ice water, and the suspension was extracted with 2.5 liter of ethyl acetate. The extraction was dried over anhydrous sodium sulfate and filtered through Celite (diatomaceous earth). After the obtained filtrate was concentrated by removing the solvent in vacuo, the resultant residue was recrystalized from a mixed solvent of acetonitrile and dichloromethane to obtain the above compound (HHTP) of 7.50 g (yield: 92%).

1-c) Synthesis of 4-heptyloxybenzoic acid (1-3a)

In a 1-liter three-necked flask were placed 35.0 g of ethyl 4-hydroxybenzonate, 54.6 g of 1-bromoheptane, 150 g of potassium carbonate and 100 ml of acetonitrile, and were vigorously stirred for 6 hours with a mechanical stirrer while the flask was heated in oil bath under reflux. After the obtained reaction mixture was cooled, it was filtered through Celite, and the resultant residue was washed with 300 ml of ethyl acetate. After the obtained filtrate was concentrated by removing the solvent in vacuo, the resultant residue was dissolved in 200 ml of ethanol. Then, an aqueous solution (40 ml) containing potassium hydroxide of 15 g was dropwise added gradually to the ethanol solution and stirred at 80° C. for 1 hour. After the resultant reaction mixture was cooled, the precipitated crystals were filtered in vacuo, and the residue was washed with 100 ml of ethanol. The washed residue was placed in 300 ml of dilute hydrochloric acid of 40° C., and stirred for 1 hour. The reaction mixture was filtered in vacuo and dried to obtain the above compound (1-3a) of 40.0 g (yield: 80%).

1-d) Synthesis of 2,3,6,7,10,11-hexa(4-heptyloxybenzoyloxy) triphenylene (1-3)

In a 200 ml flask, 8.34 g of the obtained compound (1-3a) and 10 ml of thionyl chloride were placed, and heated under reflux for 2 hours. The excess thionyl chloride was removed in vacuo under heating. After the reaction mixture was cooled, 0.70 g of the compound (HHTP) and 20 ml of pyridine were added to the mixture and stirred under reflux with heating for 20 hours. After the resultant reaction mixture was cooled, the excess pyridine was removed in vacuo, and then pure crystals of the above compound (1-3) of 3.05 g (yield: 75%) were isolated by means of silica-gel chromatography.

NMR (Solvent for measurement: $CDCl_3$)

δ0.92 (18H, t), ≡1.35 (48H, m), δ1.78 (12H, m), δ3.90 (12H, t), δ6.65 (12H, d), δ7.90 (12H, d), δ8.37 (6H, s)

Measurement of phase transition temperature by DSC and polarization microscope

Crystal phase←168° C.→Discotic nematic phase←253° C.→Isotropic phase

Synthetic Example 2

Synthesis of discotic liquid crystal (1-11; the number of the compounds described above)

2-c) Synthesis of 4-heptyloxycinnamic acid (1-11a)

In 50 ml of dimethyl sulfoxide was suspended 15.5 g of 4-hydroxycinnamic acid, 30.0 g of 1-bromoheptane and 50.0 g of potassium carbonate, and were vigorously stirred for 10 hours with a mechanical stirrer while the flask was heated in oil bath. After the obtained reaction mixture was cooled, it was filtered through Celite, and the resultant residue was washed with 300 ml of ethyl acetate. To the washed mixture was added 500 ml of water and the mixture was extracted with 2.5 liter of ethyl acetate. The obtained extract (organic layer) was concentrated by removing the solvent in vacuo. To the resultant residue was added 100 ml of ethanol, an aqueous solution (20 ml) containing potassium hydroxide of 10 g was added and stirred at 80° C. for 1 hour. After the resultant reaction mixture was cooled, the precipitated crystals were filtered in vacuo, and the residue was washed with 100 ml of ethanol. The washed residue was placed in 300 ml of dilute hydrochloric acid of 40° C., and stirred for 1 hour. The reaction mixture was filtered in vacuo and dried to obtain the above compound (e) of 19.1 g (yield: 78%).

2-d) Synthesis of 2,3,6,7,10,11-hexa(4-heptyloxycinnamoyloxy)triphenylene (1-11)

In a 200 ml flask were placed 10.4 g of the obtained compound (1-11a) and 10 ml of thionyl chloride, and heated under reflux for 2 hours. The excess thionyl chloride was removed in vacuo under heating. After the reaction mixture was cooled, 0.70 g of the compound (HHTP) [the same compound as in Synthetic Example 1] and 20 ml of pyridine were added to the mixture and stirred under reflux with heating for 20 hours. After the resultant reaction mixture was cooled, the excess pyridine was removed in vacuo. The reaction mixture was further purified by means of silica-gel chromatography, and then recrystalized from a mixed solvent of acetonitrile and acetone to isolate pure crystals of the above compound (1-11) of 3.55 g (yield: 90%).

NMR (Solvent for measurement: $CDCl_3$) δ0.92 (18H, t), δ1.35 (48H, m), δ1.78 (12H, m), δ3.90 (12H, t), δ6.50 (6H, d), δ6.65 (12H, d), δ7.25 (12H, d), δ7.83 (6H, d), δ8.20 (6H, s), Measurement of phase transition temperature by DSC and polarization microscope Crystal phase←155° C.→Discotic nematic phase←252° C.→Isotropic phase Synthetic Example 3

Synthesis of triphenylene compound (1-20; the number of the compounds described above)

3-c) Synthesis of 4-(3,6-dioxaheptyloxy)benzoic acid (1-20a).

In a 1-liter three-necked flask were placed 32.0 g of 4-hydroxybenzoic acid, 100 ml of 3,6-dioxaheptylchloride, 150 g of potassium carbonate and 100 ml of acetonitrile, and were vigorously stirred for 6 hours with a mechanical stirrer while the flask was heated in oil bath under reflux. After the obtained reaction mixture was cooled, it was filtered through Celite, and the resultant residue was washed with 300 ml of ethyl acetate. After the obtained filtrate was concentrated by removing the solvent in vacuo, the resultant residue was dissolved in 200 ml of ethanol. Then, an aqueous solution (40 ml) containing potassium hydroxide of 15 g was dropwise added gradually to the ethanol solution and stirred at 80° C. for 1 hour. After the resultant reaction mixture was cooled, the mixture was poured into 1 l of dilute hydrochloric acid. The precipitated crystals were filtered in vacuo, washed with 300 ml of ice water and dried to obtain the above compound (1-20a) of 38 g (yield: 68%).

3-d) Synthesis of 2,3,6,7,10,11-hexa[4-(3,6-dioxaheptyloxybenzoyloxy)triphenylene (1-20)

In a 200 ml three-necked flask, 8.34 g of the obtained compound (1-20a) and 10 ml of thionyl chloride were placed, and heated under reflux for 2 hours. The excess thionyl chloride was removed in vacuo under heating. After the reaction mixture was cooled, 0.70 g of the compound (HHTP) [the same compound as in Synthetic Example 1] and 20 ml of pyridine were added to the mixture and stirred for 20 hours. After the excess pyridine of the resultant reaction mixture was removed in vacuo, and then pure crystals of the above compound (1-20) of 3.05 g (yield: 75%) were isolated by means of silica-gel chromatography.

Data for identification

IR ($cm^{-1}$): 3180, 2980, 2930, 2880, 2830, 1745, 1610, 1585, 1515, 1455, 1420, 1360, 1315, 1250, 1200, 1175, 1125, 1075, 1060, 1010, 990, 940, 925, 905, 850, 815, 760, 695, 660, 635, 605.

Measurement of phase transition temperature by DSC and polarization microscope

Crystal phase←125° C.→Discotic nematic phase←226° C.→Isotropic phase

Synthetic Example 4

Synthesis of triphenylene compounds (1-23; the number of the compounds described above)

The above compound was synthesized in the same manner as Synthetic Example 3 except using 3-oxaheptylchloride instead of 3,6-dioxaheptylchloride.

Data for identification

IR ($cm^{-1}$): 3080, 2955, 2930, 2870, 1745, 1608, 1582, 1515, 1455, 1420, 1362, 1315, 1245, 1175, 1125, 1070, 1010, 980, 925, 903, 845, 815, 760, 695, 657, 635, 605.

Measurement of phase transition temperature by DSC and polarization microscope

Crystal phase←162° C.→Discotic nematic phase←222° C.→Isotropic phase

Synthetic Example 5

Synthesis of triphenylene compounds (2-4; the number of the compounds described above)

5-c) Synthesis of 3-heptyloxybenzoic acid (2-4a)

In a 2-liter three-necked flask were placed 100 g of methyl 3-hydroxybenzonate, 143 g of 1-bromoheptane, 140 g of potassium carbonate and 300 of N,N-dimethylacetamide (DMAc), and were vigorously stirred for 2 hours with a mechanical stirrer while the flask was heated in oil bath under reflux. After the obtained reaction mixture was cooled, it was poured into 1 l of water, and was extracted with ethyl acetate. Subsequently, the extract was dried under anhydrous sodium sulfate. After the extract was concentrated by removing the solvent in vacuo, the resultant residue was dissolved in 200 ml of methanol. Then, an aqueous solution (40 ml) containing potassium hydroxide of 8.4 g was dropwise added gradually to the ethanol solution and refluxed under heating for 1 hour. After the resultant reaction mixture was cooled, the precipitated crystals were filtered, and the resultant crystals were dissolved in 1.5 l of water. To the solution, 60 ml of concentrated hydrochloric acid was added. Then, the precipitated crystals were filtered in vacuo, washed with ice water and dried to obtain the above compound (2-4a) of 130 g (yield: 84%).

5-d) Synthesis of 2,3,6,7,10,11-hexa(3-heptyloxybenzoyloxy)triphenylene (2-4)

In a 200 ml three-necked flask, 44.8 g of the obtained compound (2-4a) and 44 ml of thionyl chloride were placed, and heated under reflux for 2 hours. The excess thionyl chloride was removed in vacuo under heating. After the reaction mixture was cooled, 6.5 g of the compound (HHTP) [the same compound as in Synthetic Example 1] and 200 ml of pyridine were added to the mixture and stirred for 20 hours. The excess pyridine of the resultant reaction mixture was removed in vacuo, and then pure crystals of the above compound (2-4) of 28.1 g (yield: 86%) were isolated by means of silica-gel chromatography.

Data for identification

IR ($cm^{-1}$): 3070, 2950, 2930, 2850, 1740, 1600, 1440, 1420, 1320, 1285, 1275, 1215, 1100, 1090, 1060, 890, 800, 740.

Synthetic Example 6

Synthesis of triphenylene compounds (2-2; the number of the compounds described above)

The above compound was synthesized in the same manner as Synthetic Example 5 except using 1-bromopentane instead of 1-bromoheptane.

Data for identification

IR ($cm^{-1}$): 3070, 2950, 2930, 2850, 1750, 1600, 1580, 1510, 1490, 1440, 1420, 1320, 1285, 1275, 1215, 1120, 1060, 800, 740.

Synthetic Example 7

Synthesis of triphenylene compounds (2-17; the number of the compounds described above)

The above compound was synthesized in the same manner as Synthetic Example 5 except using 4-hydroxycinnamic acid instead of methyl 3-hydroxybenzonate.

Data for identification

IR ($cm^{-1}$): 3070, 2950, 2930, 2850, 1740, 1640, 1600, 1580, 1500, 1490, 1440, 1420, 1250, 1220, 1130, 980, 890, 850, 780, 680.

The optical compensatory sheet of the invention is composed of a transparent support and the optically anisotropic layer thereon. The support may be a support of a liquid crystal cell. Further, a orientation layer is preferably provided between the support and the optically anisotropic layer.

The optical compensatory sheet of the invention can be, for example prepared in the following manner.

As material of the transparent support employable in the invention, any material can be employed so long as they are transparent. The material preferably has a transmittance of not less than 80% and especially show optical isotropy when it is viewed from a front side. Further, the support preferably has a negative uniaxial property and an optic axis in the normal line direction.

Therefore, the support (film) is preferably prepared from materials having a small intrinsic birefringence, such as triacetyl cellulose. Such material is available on market by the trade name of Geonex (from Nippon Geon Co., Ltd.), Arton (from Japan Synthetic Rubber Co., Ltd.) and Fuji TAC (from Fuji Photo Film Co., Ltd.).

However, materials having a large intrinsic birefringence such as polycarbonate, polyarylate, polysulfone and polyethersulfone can be also employed by rendering the materials optically isotropic through appropriately controlling molecular orientation in a procedure of forming a film.

The transparent film generally satisfies the condition of:

$$|nx-ny|/|nx-nz|\leqq 0.2$$

in which nx and ny is main refractictive indices within the film and nz is a main refractive index in a thickness direction of the film.

The transparent film preferably satisfies the condition of:

$$0\leqq|nx-ny|\times d\leqq 50\ (\mathrm{nm})$$

and more preferably:

$$0\leqq|nx-ny|\times d\leqq 20\ (\mathrm{nm})$$

in which nx and ny has the same meanings as above and d is a thickness direction of the film.

Especially, the transparent film preferably satisfies the condition of:

$$20\leqq[(nx+ny)/2-nz\}\times d\leqq 400\ (\mathrm{nm})$$

in which nx, ny and nz have the same meanings as above, whereby the viewing angle can be greatly increased. Further, the transparent film preferably satisfies the condition of:

$$30\leqq[(nx+ny)/2-nz\}\times d\leqq 150\ (\mathrm{nm})$$

"nx", "ny", "nz" and "d" described above are shown in FIG. 1. "nx" and "ny" are main refractictive indices on the plane of the film, "nz" is a main refractive index in a thickness direction of the transparent film and d is the thickness of the film.

The orientation layer is generally provided on the transparent support. The orientation layer has a function of defining an orientation direction of the discotic compounds (discotic liquid crystal) provided thereon by a coating method, and the orientation gives an optic axis (which means a direction showing the minimum deterdation in the invention) inclined from an optical compensatory sheet. As the orientation layer, any layers can be employed so long as they are capable of imparting orientation property to a layer of liquid crystal. Preferred examples of the orientation layer include a layer of an organic compound (preferably polymer) subjected to rubbing treatment, and an obliquely deposited layer of an inorganic compound. In addition, a layer prepared by orienting dielectric materials by application of electric field or magnetic field can be employed as the orientation layer. Otherwise, the optically anistropic layer (discotic compound layer) is provided on the support with no orientation layer, and then electric field or magnetic field is applied to the layer from the desired direction (so as to obtain desired tilt angle) at a temperature forming discotic nematic phase.

Examples of material for the orientation layer include polymers such as polymethyl methacrylate, acrylic acid/methacrylic acid copolymer, styrene/maleinimide copolymer, polyvinyl alcohol, poly(N-methylolacrylamide), styrene/vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, polyethylene, polypropylene and polycarbonate; and organic substances such as silan coupling agents.

Preferred examples of polymers for the orientation layer include polyimide, polystyrene, gelatin, poll;vinyl alcohol and polyvinyl alcohol having an alkyl group (preferably having 6 or more carbon atoms). Orientation layers obtained by subjecting layers of these polymers to orientation treatment, are capable of tilting obliquely discotic liquid crystal.

The polyvinyl alcohol and the polyvinyl alcohol having an alkyl group are especially preferred from the viewpoint of uniform orientation of the discotic liquid crystal. The polyvinyl alcohol preferably has a saponification value of not less than 80% and a degree of polymerization of not less than 200. The polyvinyl alcohol having an alkyl group is available as trade names of MP103, MP203 and R1130 (produced by Kuraray Co., Ltd.)

Polyimide film (preferably fluorine-containing polyimide film), which is widely used as an orientation layer for a liquid crystal cell, is also preferably employed as the orientation layer of the invention. The polyimide film can be prepared by coating a solution of polyamic (polyamide) acid (e.g., a series of LQ/LX available from Hitachi Chemical Co., Ltd.; and a series of SE available from Nissan Chemical Industries, Ltd.) on the transparent support, dried at 100° to 300° C. for 0.5 to 1 hour, and rubbing a surface of the resultant polyimide film.

The orientation layer for the optically anisotropic layer can be rubbed in the known manner which is conventionally performed to prepare an orientation layer for liquid crystal of LCD. In more detail, the treatment is a method that gives a function of orienting a liquid crystal to a surface of the orientation layer by rubbing the surface in a certain direction by the use of a paper, a gauze, a felt, a rubber, or a fiber of polyamide or polyester. The rubbing procedure is generally performed by rubbing a surface of the orientation layer in several times using a cloth in which fibers having uniform length and width are arranged.

Figure 2:
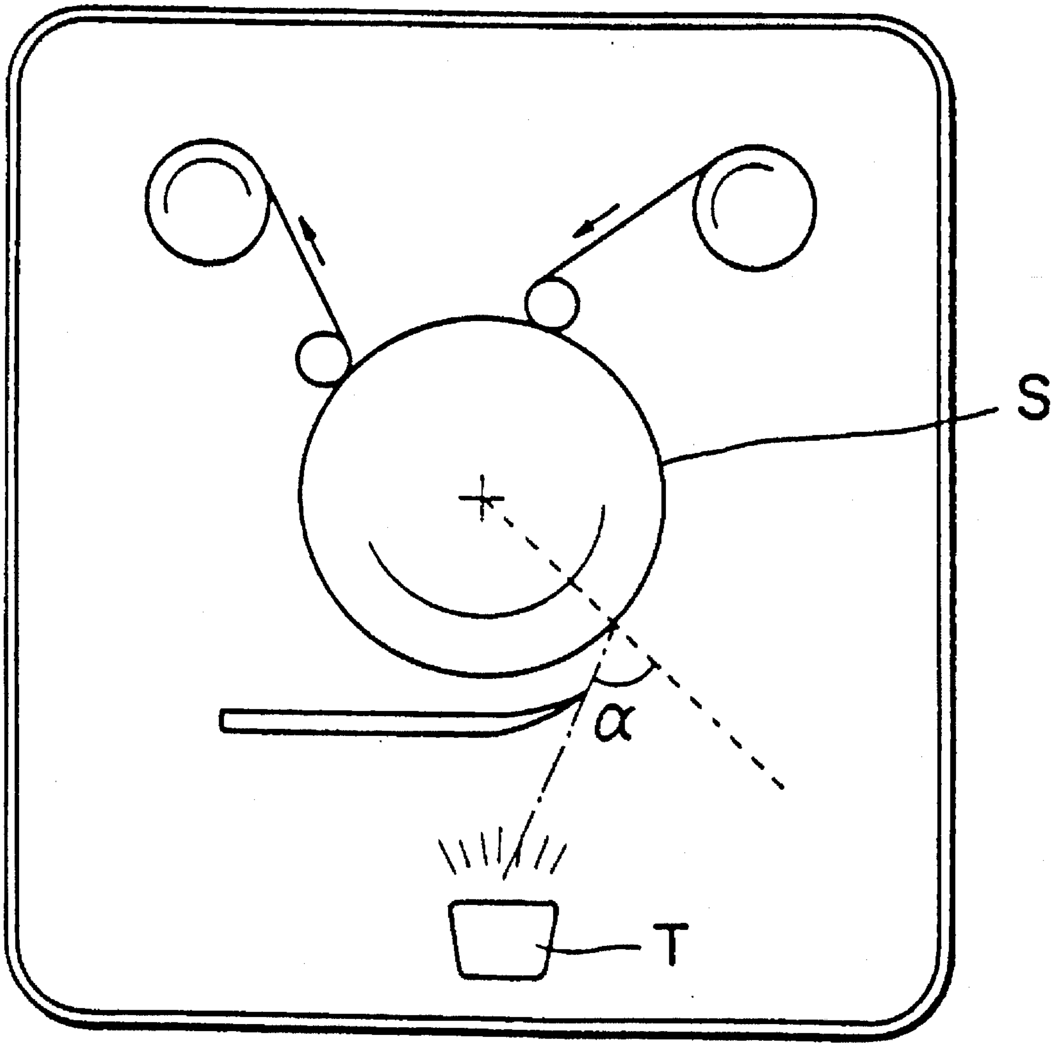
FIG. 2 is a sectional view of a metallizing apparatus employed in the case the support is continuously metallized to give a film.

As the orientation layer, an obliquely deposited layer of an inorganic compound is employable in the invention. Examples of the inorganic compounds include metal oxides or metal fluorides such as SiO, $TiO_2$, $MgF_2$ and $ZnO_2$ and metals such as Au and Al. As the inorganic compound, any compounds can be employed so long as they have high dielectric constant (permittivity). The obliquely deposited film of an inorganic compound can be prepared using the metallizing apparatus illustrated in FIG. 2. The metallizing apparatus of FIG. 2 is employed in the case that the support is continuously metallized to give a film. In FIG. 2, the support film S is arranged in a such a manner that an angle where a normal line of a tangent line of the support film S and the evaporating direction from an evaporation source T intersect becomes α (α=88–10 degrees). In the case of using $SiO_2$ as the evaporation material, vapor deposition at a deposition angle of 65 to 88 degree gives an orientation film on which a discotic liquid crystal is uniformly oriented in the direction where the deposited particle column and the optic axis of the discotic liquid crystal almost intersect at right angle. Further, vapor deposition at a deposition angle of 20 to 65 degree gives an orientation film on which a discotic liquid crystal is uniformly oriented in the direction where the deposited particle column and the optic axis of the discotic liquid crystal almost is parallel each other. The metallizing may be conducted in the condition that the support is fixed.

The optical compensatory sheet is preferably prepared by forming an orientation layer on a transparent support and forming the optically anisotropic layer on the orientation layer, as mentioned above.

The optically anisotropic layer can be, for example, formed on the orientation layer in the following manner.

A mixture of the discotic compound capable of forming a discotic nematic phase (e.g., compound of the formula (1)) and the specific organic compound (e.g., compound of the formula (2)) can be prepared: by mixing powders thereof the use of a ball mill, a paint shaker or a mortar; or by mixing them in the melted condition or liquid condition; or by mixing solutions of powders thereof in solvents.

Examples of solvents employable in the method mixing solutions, include polar solvents such as N,N-dimethylformamide (DMF), dimethyl sulfoxide (DMSO) and pyridine, nonpolar solvents such as benzene and hexane, alkyl halides such as chloroform and dichloromethan, esters such as methyl acetate and butyl acetate, ketones such as acetone and methyl ethyl ketone, and ethers such tetrahydrofuran and 1,2-dimethoxyethan. Preferred are alkyl halides and ketones. The solvents may be employed singly or in combination.

The method for coating the above mixture or solution thereof includes curtain coating method, extrusion coating method, roll coating method, dip coating method, spin coating method, print coating method, coating method using slide coater and spray coating method. In the invention, vapor deposition method may be used, in the case of a mixture of only discotic compounds. In the invention, a continuously coating method is preferred. Therefore, coating methods such as curtain coating method, extrusion coating method, roll coating method and coating method using slide coater are preferred.

Figure 3:
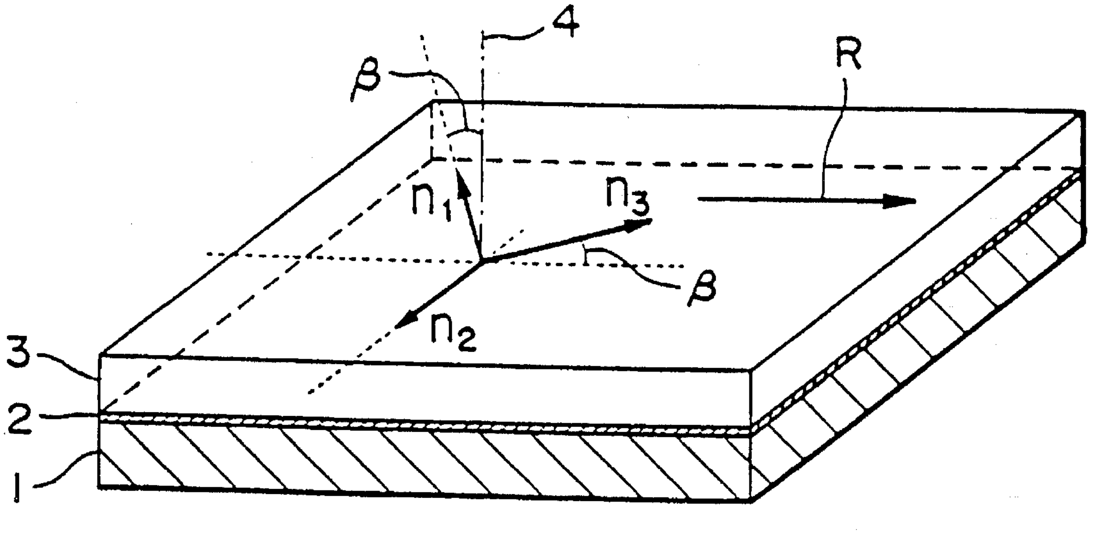
FIG. 3 is a view schematically showing the refractive indices of the three axes of the optical compensatory sheet of the invention.

The representative structure of the optical compensatory sheet employed in the invention is shown in FIG. 3. In FIG. 3, a transparent support 1, an orientation layer 2 and an optically anisotropic layer 3 are superposed in order to constitute the optical compensatory sheet. The reference number R indicates the rubbing direction of the orientation layer. The reference numbers $n_1$, $n_2$ and $n_3$ indicate refractive indices in the three axes direction of the optical compensatory sheet, and $n_1$, $n_2$ and $n_3$ satisfy the condition of $n_1 \leq n_2 \leq n_3$, in the case that are seen in the front direction. The reference number β is an inclined angle of the optic axis from the normal 4 of the optical compensatory sheet.

The negative uniaxial property, that the optical compensatory sheet of the invention generally has, means property as satisfies the condition of:

$$n_1 < n_2 = n_3$$

in which $n_1$, $n_2$ and $n_3$ are refractive indices in the three axes directions of a optical compensatory sheet and $n_1$, $n_2$ and $n_3$ satisfy $n_1 \leq n_2 \leq n_3$. However, $n_2$ and $n_3$ are not required to be strictly equal to each other and it will be satisfied that they are approximately equal to each other. In more detail, there is no problem in practical use as long as the negative uniaxial property satisfies the condition of:

$$|n_2 - n_3| / |n_2 - n_1| \leq 0.2$$

in which $n_1$, $n_2$ and ns have the meanings described above.

In order to greatly improving viewing angle characteristics of TN-LCD or TFT-LCD, the optic axes of the optical compensatory sheet is inclined at 20 to 34 degrees from a normal line of the sheet (β in FIG. 3). The inclined angle is determined using an ellipsometer.

Further, it is preferred that the sheet satisfies the condition of:

$$50 \leq \Delta n \times d \leq 400 \text{ (nm)}$$

in which d is a thickness of the sheet and $\Delta n = n_2 - n_1$.

Figure 4:
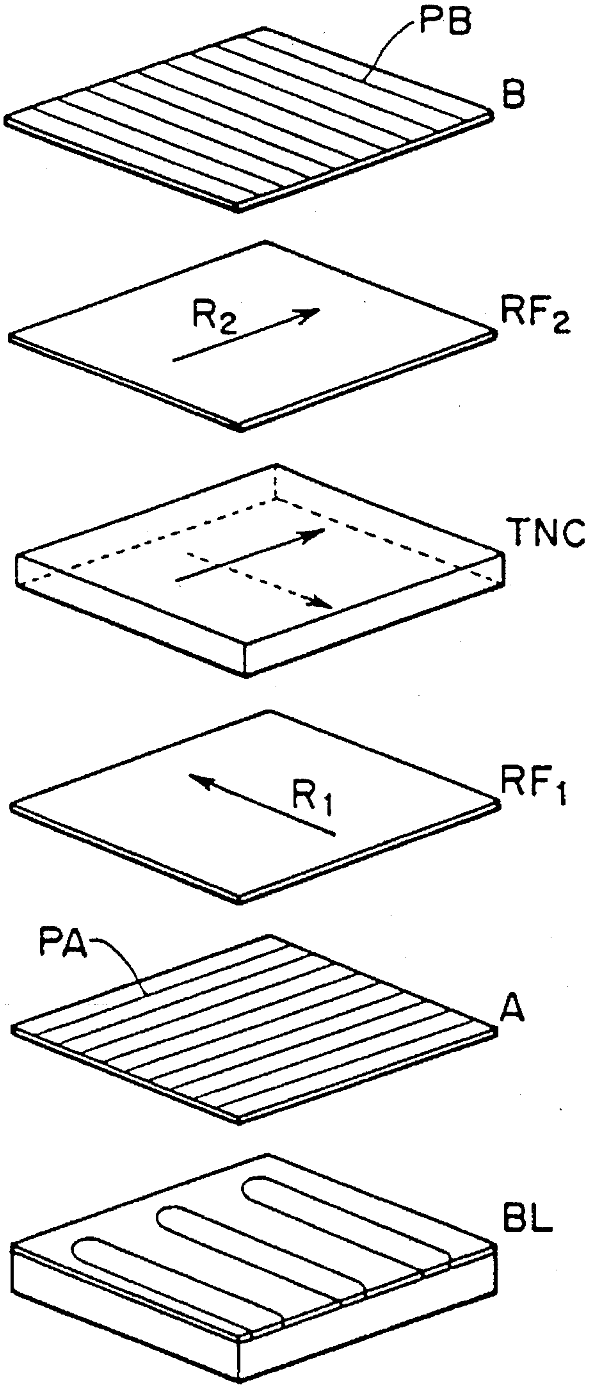
FIG. 4 is a view schematically showing the representative structure of the liquid crystal display of the invention.

The representative structure of the liquid crystal display of the invention is shown in FIG. 4. In FIG. 4, a liquid crystal cell TNC comprising a pair of substrates provided with a transparent electrode and a twist-oriented nematic liquid crystal sealed therebetween, a pair of polarizing sheets A and B arranged on the both sides of the cell, the optical compensatory sheets RF1 and RF2 between the liquid crystal cell and the polarizing sheet and back light BL are assembled to constitute the liquid crystal display. The optical compensatory sheet may be arranged only on one side (i.e., use of one of RF1 and RF2). The reference number R1 is a rubbing direction of the orientation layer of the optical compensatory sheets RF1, and the reference number R2 is the rubbing direction of the orientation layer of the optical compensatory sheets RF2, in the case that are seen in the front direction. An arrow of a solid line of the liquid crystal cell TNC indicates the rubbing direction of the polarizing sheet B side substrate of TNC, and an arrow of a dotted line of the liquid crystal cell TNC indicates the rubbing direction of the polarizing sheet A side substrate of TNC. PA and PB are polarizing axes of polarizing sheets A and B, respectively.

The reason why the optical compensatory sheet indicated in FIG. 3 gives much increase of viewing angle is assumed as follows:

Most of TN-LCD adopt normally white mode. In the mode, a light transmittance in a black display portion extremely increases with increase of viewing angle, which results in rapid reduction of contrast. In the condition of black display (the condition where voltage is applied), it is considered that TN-type liquid crystal cell shows an optically anisotropic property and a positive uniaxial property which is slightly inclined from a normal to a surface of the cell. When an intermediate gradation is displayed, optic axes of the optically anisotropic substances are further inclined from the normal to a surface of the cell.

In the case that an optic axis of the TN-type liquid crystal cell is inclined from the normal to a surface of the cell, use of a optically anisotropic substance having an optic axis in a normal direction is considered not to appropriately compensate the phase difference by the cell. In other words, an optically anisotropic substance is needed for the cell to have an optic axis inclined from the normal. Further, when the cell is regarded as a composite of optically anisotropic substances with a positive uniaxial property, an optically anisotropic substance having a negative uniaxial property is suitably used for compensation of phase difference by the cell. Thus, use of an optically anisotropic substance of a negative uniaxial property having optic axis inclined from the normal (i.e., optical compensatory sheet of the invention) improves viewing angle characteristics.

Furthermore, it is mere approximation that the liquid crystal cell behaves as optically anisotropic substance with a positive uniaxial property having optic axis inclined from the normal. Therefore, use of the optically anisotropic substance does not give much satisfactorily compensation of phase difference.

Thus, the TN-type liquid crystal cell is preferably regarded as a composite of two optically anisotropic substances having a positive uniaxial property which has a inclined angle equal to each other and inclination direction differing from each other. In the case that the TN-type liquid crystal cell is considered as above, great improvement of viewing angle characteristics can be obtained by employing the optical compensatory sheet which is prepared by, for example, superposing an optically anisotropic substance (optically anisotropic layer) having an optically negative monoaxial and an optic axis inclined to the normal, on an optically anisotropic substance (transparent support) having an optically negative monoaxial and an optic axis in the normal direction.

As materials of liquid crystal employed for the liquid crystal cell, any known materials can be employed so long as they are TN-CL or STN-CL.

Examples of the present invention and comparison examples are given below, but these examples by no means restrict the invention.

EXAMPLE 1

Preparation of optical compensatory sheet

On a glass plate (thickness: 1 mm; size: 25 mm×25 mm), a coating solution of polyamic acid (SE-7210, available from Nissan Chemical Industries, Ltd.) was coated, burned at 180° C. to form a polyimide layer and rubbing a surface of the layer using a rubbing machine to form an orientation layer.

Two kinds of discotic compounds shown in Tables 1 to 3 were mixed in the ratio in Tables 1 to 3 to prepare mixtures, and the mixtures were dissolved in methyl ethyl ketone to prepare 10 weight % solutions of the discotic compounds. The solutions were coated on the orientation layer at 3,000 rpm using a spin-coater.

Subsequently, each of the coated layers was heated on a hot plate (FP82HT, available from Metler Co., Ltd.) and its phase transition was observed by a polarizing microscope.

The obtained result was set forth in Tables 1 to 3.

TABLE 1

| Sample Ratio of Discotic Compounds | Transition Temp. to Nematic Discotic Phase | Transition Temp. to Isotropic Phase |
|---|---|---|
| *1-3/2-2 = 2/1 | 140° C. | 184° C. |
| 1-3/2-2 = 3/2 | 125° C. | 139° C. |
| 1-3/2-4 = 4/1 | 126° C. | 212° C. |
| 1-3/2-4 = 3/1 | 120° C. | 196° C. |
| 1-3/2-4 = 2/1 | 105° C. | 130° C. |
| 1-3/— = 1/— | 168° C. | 253° C. |

Note:
* The number corresponds to the number of compounds of the formulae (1) and (2) described previously.

TABLE 2

| Sample Ratio of Discotic Compounds | Transition Temp. to Nematic Discotic Phase | Transition Temp. to Isotropic Phase |
|---|---|---|
| 1-4/2-2 = 4/1 | 135° C. | 205° C. |
| 1-4/2-2 = 3/1 | 125° C. | 196° C. |
| 1-4/2-4 = 4/1 | 140° C. | 192° C. |
| 1-4/2-4 = 3/1 | 130° C. | 177° C. |
| 1-4/2-4 = 2/1 | 121° C. | 145° C. |
| 1-4/— = 1/— | 170° C. | 244° C. |

TABLE 3

| Sample Ratio of Discotic Compounds | Transition Temp. to Nematic Discotic Phase | Transition Temp. to Isotropic Phase |
|---|---|---|
| 1-4/2-17 = 4/1 | 136° C. | 177° C. |
| 1-4/2-17 = 3/1 | 135° C. | 155° C. |
| 1-4/2-17 = 2/1 | 125° C. | 145° C. |
| 1-5/2-2 = 4/1 | 150° C. | 199° C. |
| 1-5/2-2 = 3/1 | 135° C. | 168° C. |
| 1-5/— = 1/— | 188° C. | 210° C. |

From Tables 1 to 3, it was confirmed that the combination of two kinds of discotic compounds according to the invention brought out reduction of the transition temperature (from crystal phase) to nematic discotic phase compared with use of a discotic liquid crystal.

Comparison Example 1

On polyethersulfone film (PES) of a thickness of 100 μm (FS-1300, available from Sumitomo Bakelite Co., Ltd.), a coating solution of polyamic acid (SE-7210, available from Nissan Chemical Industries, Ltd.) was coated, burned at 180° C. to form a polyimide layer and rubbing a surface of the layer using a rubbing machine to form an orientation layer.

The discotic compound (1-4; the number of the aforementioned compounds) was dissolved in methyl ethyl ketone to prepare 10 weight % solutions of the discotic compound. The solution was coated on the orientation layer at 3,000 rpm using a spin-coater to form an optically anisotropic layer of the discotic compound having a thickness of 1 μm which was not oriented.

The optically anisotropic layer of discotic compound (1-4) was observed by a polarizing microscope and it was confirmed that the discotic compound (1-4) had discotic nematic phase in the range of 170° to 238° C. Therefore, the temperature to orient the layer of discotic compound was set for 180° C.

According to the above findings, the composite (film) consisting of the polyethersulfone film, orientation layer and the optically anisotropic layer was pressed to a heated metal roller having a surface of temperature of 180° C. for 10 seconds, and immediately the composite was pressed to a metal roller having a surface of temperature of 20° C. for 10 seconds to prepare an optical compensatory sheet.

The optical compensatory sheet was observed by a polarizing microscope, and it was confirmed that the layer of discotic compound showed discotic nematic phase and was macroscopically oriented in one direction.

EXAMPLE 2

On polyethersulfone film (PES), a coating solution of polyamic acid (SE-7210, available from Nissan Chemical Industries, Ltd.) was coated to form an orientation layer in the same manner as in Comparison Example 1.

A mixture of the discotic compound (1-4, the number of the aforementioned compounds) and the discotic compound (2-2, the number of the aforementioned compounds; mixed ratio: 1-4/2-2=9/1, by weight) was dissolved in methyl ethyl ketone to prepare 10 weight % solutions of the discotic compounds. The solution was coated on the orientation film at 3,000 rpm using a spin-coater to form an optically anisotropic layer of the discotic compounds having a thickness of 1 μm which was not oriented.

The optically anisotropic layer of the mixture of the discotic compounds (1-4/2-2=9/1) was observed by a polarizing microscope and it was confirmed that the mixture had discotic nematic phase in the range of 135° to 205° C. Therefore, the temperature to orient a layer of discotic compound was set for 150° C.

According to the above findings, the composite (film) consisting of the polyethersulfone film, orientation layer and the layer of discotic compound was pressed to a heated metal roller having a surface of 150° C. for 10 seconds, and immediately the composite was pressed to a metal roller having a surface of temperature of 20° C. for 10 seconds to prepare an optical compensatory sheet.

The optical compensatory sheet was observed by a polarizing microscope, and it was confirmed that the layer of discotic compound showed discotic nematic phase and was macroscopically oriented in one direction.

EXAMPLE 3

On polyethersulfone film (PES), a coating solution of polyamic acid (SE-7210, available from Nissan Chemical Industries, Ltd.) was coated to form an orientation layer in the same manner as in Comparison Example 1.

A mixture of the discotic compound (1-4, the number of the aforementioned compounds) and the discotic compound (2-2, the number of the aforementioned compounds; mixed ratio: 1-4/2-2=8/2, by weight) was dissolved in methyl ethyl ketone to prepare 10 weight % solutions of the discotic compound. The solution was coated on the orientation layer at 3,000 rpm using a spin-coater to form an optically anisotropic layer of the discotic compounds having a thickness of 1 μm which was not oriented.

The optically anisotropic layer of the mixture of the discotic compounds (1-4/2-2=8/2) was observed by a polarizing microscope and it was confirmed that the mixture had discotic nematic phase in the range of 125° to 196° C. Therefore, the temperature to orient a layer of discotic compound was set for 140° C.

According to the above findings, the composite (film) consisting of the polyethersulfone film, orientation layer and the optically anisotropic layer was pressed to a heated metal roller having a surface of 140° C. for 10 seconds, and immediately the composite was pressed to a metal roller having a surface of temperature of 20° C. for 10 seconds to prepare an optical compensatory sheet.

The optical compensatory sheet was observed by a polarizing microscope, and it was confirmed that the layer of discotic compound showed discotic nematic phase and was macroscopically oriented in one direction.

Comparison Example 2

On polyethersulfone film (PES), a coating solution of polyamic acid (SE-7210, available from Nissan Chemical Industries, Ltd.) was coated to form an orientation film in the same manner as in Comparison Example 1.

The discotic compound (2-2, the number of the aforementioned compounds) was dissolved in methyl ethyl ketone to prepare 10 weight % solutions of the discotic compound. The solution was coated on the orientation film at 3,000 rpm using a spin-coater to form an optically anisotropic layer of the discotic compounds having a thickness of 1 μm which was not oriented.

The layer of discotic compound (2-2) was observed by a polarizing microscope and it was confirmed that the discotic compound (2-2) had no discotic nematic phase and had isotropic phase at 115° C.

According to the above findings, the composite (film) consisting of the polyethersulfone film, orientation layer and the optically anisotropic layer was pressed to a heated metal roller having a surface of 120° C. for 10 seconds, and immediately the composite was pressed to a metal roller having a surface of temperature of 20° C. for 10 seconds to prepare an optical compensatory sheet.

The optical compensatory sheet was observed by a polarizing microscope, and it was confirmed that the layer of discotic compound showed isotropic phase.

Comparison Example 3

A polyethersulfone film (PES) of Comparison Example 1, which has no orientation film and layer of discotic compound, was prepared as an optical compensatory sheet.

[Evaluation of optical compensatory sheet]

As for the optical compensatory sheets obtained in Examples 2 and 3 and Comparison Examples 1 to 3, optical characteristics were evaluated below.

The angle (β) where the optic axis (or direction in which retardation value shows the minimum) and the normal line of the sheet intersect, and retardation (Δn·d) were determined. Re values at various incident angles were measured by an ellipsometer (AEP-100, available from Shimadzu Seisakusho, Ltd.) in transmission mode to determine incident angle dependence of Re. From data of the incident angle dependence of Re, the optimum refraction indices in the three directions ($n_1$, $n_2$ and $n_3$), the optimum retardation (Δn,d) and angle (β) of the optic axis were calculated.

The obtained result is set forth in Table 4.

Preparation of liquid crystal display

Each of the optical compensatory sheets obtained in Examples 2 and 3 and Comparison Examples 1 to 3 was attached to TN-type liquid crystal cell that the product of the difference between an extraordinary ray and an ordinary ray of the liquid crystal and the clearance between the substrates of the liquid crystal cell was 490 nm, and the twisted angle of the liquid crystal was 90 degrees.

The obtained TN-LCD has a structure shown in FIG. 4.

[Evaluation of liquid crystal display]

To the TN-LCD, a rectangular wave of 30 Hz was applied at a voltage of 0 to 5 V, and transmittances (T) were measured by varying viewing angle using a spectrophotometer (LCD-5000, available from Otsuka Electronics Co., Ltd.). From the measured data, the angle against the normal at which the contrast ($T_{0v}/T_{5v}$) on a black-and-white display showed 10 was defined as viewing angle and the viewing angles in a height (upper-lower) direction and a width (left-right) direction of the TN-LCD were determined. The contrast when the cell was viewed from the front side was also measured.

The obtained result is set forth in Table 4.

TABLE 4

| Example | 1–4/ 2–2 | Temp. for Orien-tation (°C.) | Δn · d (nm) | Optic angle (β) (degree) | Viewing upper-lower (degree) | Angle left-right (degree) | Con-trast |
|---|---|---|---|---|---|---|---|
| Com. Ex. 1 | 10/— | 180 | 102 | 39 | 65 | 67 | 130 |
| Ex. 2 | 9/1 | 150 | 98 | 30 | 70 | 72 | 150 |
| Ex. 3 | 8/2 | 140 | 95 | 20 | 73 | 78 | 150 |
| Com. Ex. 2 | —/10 | 120 | — | — | 21 | 34 | 145 |
| Com. Ex. 3 | — | — | — | — | 21 | 34 | 150 |

As is apparent from the results in Table 4, the optical compensatory sheets of the invention (Examples 2 and 3) can be obtained by heat-treatment at lower temperature than that in the sheet using one discotic liquid crystal (Comparison Example 1). Further, the liquid crystal displays of Examples 2 and 3 showed increased viewing angle and high contrast compared with the display of Comparison Example 1.

We claim:

1. An optical compensatory sheet comprising a transparent support and an optically anisotropic layer provided thereon and having an optic axis inclined at 20 to 34 degrees from the normal of the sheet, wherein the optically anisotropic layer is formed from a discotic compound capable of forming a discotic nematic phase and an organic compound which has compatibility with the discotic compound and is capable of lowering a transition temperature to the discotic nematic phase by at least 10° C.

2. The optical compensatory sheet as defined in claim 1, wherein an orientation layer is provided between the transparent support and the optically anisotropic layer.

3. The optical compensatory sheet as defined claim 2, wherein the orientation layer is a polymer layer which has been subjected to rubbing treatment.

4. The optical compensatory sheet as defined claim 2, wherein the orientation layer is prepared by obliquely depositing an inorganic compound on the support.

5. The optical compensatory sheet as defined in claim 1, wherein the optically anisotropic layer is in the condition of the discotic nematic phase.

6. The optical compensatory sheet as defined in claim 1, wherein the organic compound is a discotic compound capable of forming no discotic nematic phase.

7. The optical compensatory sheet as defined in claim 1, wherein the discotic compound capable of forming a discotic nematic phase has one structure selected from a benzene structure, a triphenylene structure, a truxene structure and a phthalocyanine structure.

8. The optical compensatory sheet as defined in claim 1, wherein the organic compound is a discotic compound having one structure selected from a benzene structure, a triphenylene structure, a truxene structure and a phthalocyanine structure.

9. The optical compensatory sheet as defined in claim 1, wherein the discotic compound capable of forming a discotic nematic phase has a triphenylene structure.

10. The optical compensatory sheet as defined in claim 1, wherein the organic compound is a discotic compound having a triphenylene structure.

11. The optical compensatory sheet as defined in claim 1, wherein the discotic compound capable of forming a discotic nematic phase has the formula (1):

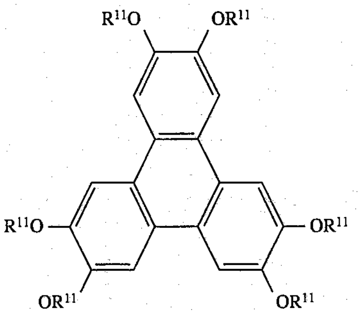

(1)

in which $R^{11}$ represents the group (1a):

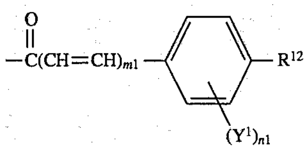

(1a)

wherein $R^{12}$ represents an alkoxy group, $Y^1$ represents a halogen atom, an alkyl group of 1 to 3 carbon atoms or an alkoxy group of 1 to 3 carbon atoms, m1 represents 0 or 1 and n1 represents 0, 1 or 2, the number of the carbon atom of $R^{12}$ being not less than that of $Y^1$.

12. The optical compensatory sheet as defined in claim 1, wherein the organic compound has the formula (2):

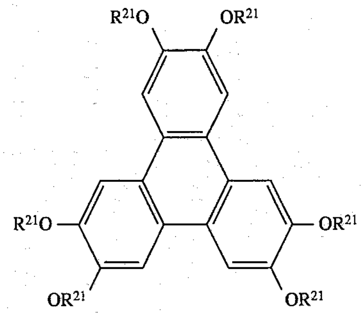

(2)

in which $R^{21}$ represents the group (2a):

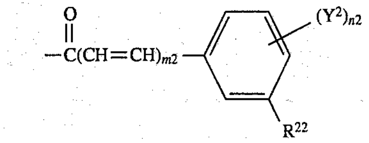

(2a)

wherein $R^{22}$ represents an alkyl group or an alkoxy group, $Y^2$ represents a halogen atom, an alkyl group of 1 to 7 carbon atoms or an alkoxy group of 1 to 7 carbon atoms, m2 represents 0 or 1 and n2 represents 0, 1 or 2, the number of the carbon atom of $R^{22}$ being not less than that of $Y^2$.

13. The optical compensatory sheet as defined in claim 1, the ratio between the discotic compound capable of forming a discotic nematic phase and the organic compound is in the range of 50:50 to 99:1, by weight.

14. The optical compensatory sheet as defined claim 1, wherein the transparent support has a light transmittance of not less than 80%, shows optically isotropy on the plane of the film, and satisfies the condition of:

$$30 \leqq [(nx+ny)/2-nz] \times d \leqq 150$$

in which nx and ny are main refractictive indices on the plane of the support, nz is a main refractive index in the thickness direction, and d is the thickness of the support, unit of d being nm.

15. A liquid crystal display comprising a liquid crystal cell which comprises a pair of substrates provided with a transparent electrode and twist-oriented nematic liquid crystal sealed therebetween, a pair of polarizing sheets arranged on both sides of the cell, and an optical compensatory sheet provided between the liquid crystal cell and the polarizing sheet;

wherein the optical compensatory sheet comprises a transparent support and an optically anisotropic layer provided thereon and has an optic axis inclined at 20 to 34 degrees from the normal of the sheet, the optically anisotropic layer being formed from a discotic compound capable of forming a discotic nematic phase and an organic compound which has compatibility with the discotic compound and is capable of lowering a transition temperature to the discotic nematic phase by at least 10° C.

16. The liquid crystal display as defined in claim 15, wherein an orientation layer is provided between the transparent support and the optically anisotropic layer.

17. The liquid crystal display sheet as defined in claim 15, wherein the optically anisotropic layer is in the condition of the discotic nematic phase.

18. The liquid crystal display as defined in claim 15, wherein the organic compound is a discotic compound capable of forming no discotic nematic phase.

19. The liquid crystal display as defined in claim 15, wherein the discotic compound capable of forming a discotic nematic phase has a triphenylene structure.

20. The liquid crystal display as defined in claim 15, wherein the organic compound is a discotic compound having a triphenylene structure.

* * * * *